United States Patent
Ueda

[15] 3,688,657
[45] Sept. 5, 1972

[54] AUTOMATIC EXPOSURE INDICATION APPARATUS FOR A CAMERA

[72] Inventor: Hiroshi Ueda, Nara, Japan

[73] Assignee: Minolta Camera Co., Ltd., Osaka-shi, Osaka-fu, Japan

[22] Filed: Dec. 3, 1970

[21] Appl. No.: 94,886

[30] Foreign Application Priority Data

Dec. 8, 1969 Japan ...................44/116917

[52] U.S. Cl..............................95/10 CT, 95/53 EB
[51] Int. Cl........G03b 7/08, G03b 9/62, G03b 17/18
[58] Field of Search ....95/10 C, 10 CE, 10 CT, 53 R, 95/53 EA, 53 EB

[56] References Cited

UNITED STATES PATENTS

| 3,491,670 | 1/1970 | Rentschler...........95/10 CT X |
|---|---|---|
| 3,555,984 | 1/1971 | Rentschler............95/53 EB X |
| 3,527,149 | 9/1970 | Starp et al. ..............95/10 CT |
| 3,504,601 | 4/1970 | Schubert .................95/10 CT |
| 3,442,190 | 5/1969 | Erickson..................95/10 CT |

*Primary Examiner*—Joseph F. Peters
*Attorney*—Watson, Cole, Grindle & Watson

[57] ABSTRACT

A shutter speed setting member is mechanically connected to an electrical timing circuit and an electrical control circuit wherein the movement of the setting member to either an automatic exposure controlling position or any one of a number of manual exposure setting positions actuates respective change-over switches in the timing control circuitry to adjust the exposure and to provide an indication as to whether the exposure is proper so that the photograph will be unaffected by camera movement.

3 Claims, 4 Drawing Figures

F I G. 1
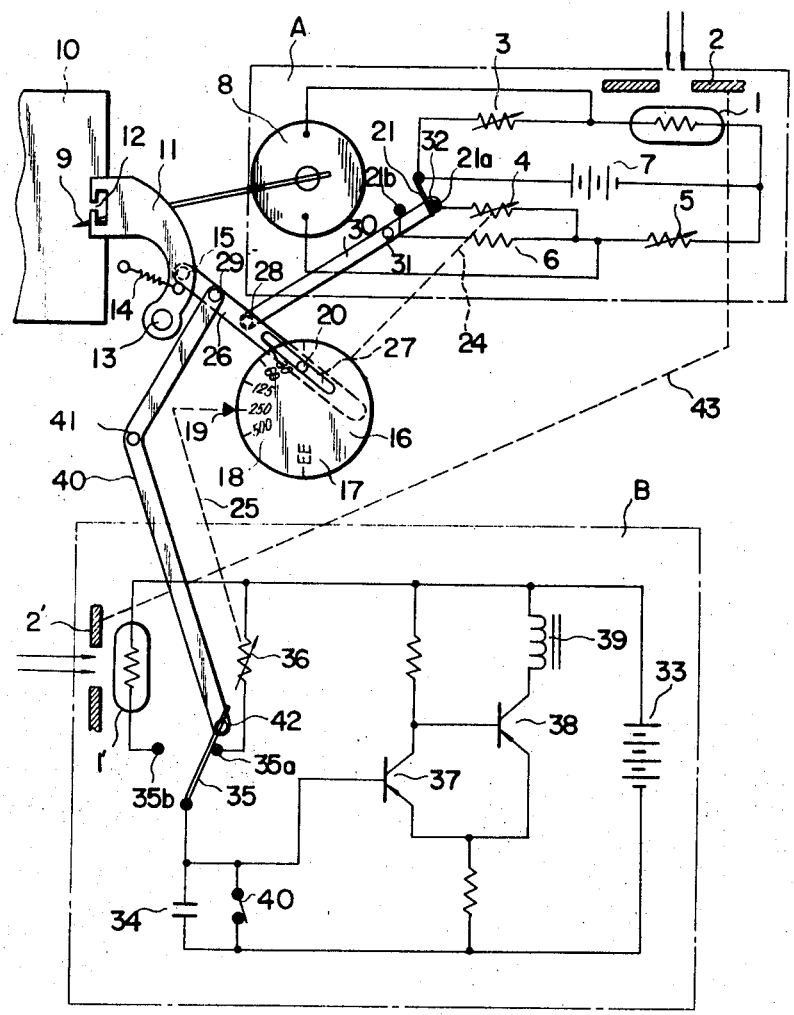

AUTOMATIC EXPOSURE INDICATION APPARATUS FOR A CAMERA

BACKGROUND OF THE INVENTION

The present invention relates to a shutter speed indication device in a camera wherein exposure is automatically controlled in response to the scene light and more particularly in a camera wherein the exposure is adjusted by adjusting the pointer of an ammeter the deflection position of which is fixed by an addition mechanism which sums the brightness of an object, the film sensitivity, the diaphragm setting, and the shutter speed. Using the zero-method of adjusting and a shutter speed indication device wherein a shutter speed automatic control mechanism is controlled by a photoelectric cell and when the diaphragm preferential shutter speed automatic control is carried out the shutter speed is indicated to warn whether camera movement will affect the photograph.

In a camera well known in the prior art, the shutter speed automatic control is effected by an addition mechanism which sums the brightness of an object, the film sensitivity, and the diaphragm setting. That is, for example, in a camera provided with an electric shutter the light rays incident through the diaphragm are received by a light receiving element, and a time constant delay circuit is composed of the light receiving element and a condenser connected in series therewith. The delay circuit is adjusted in accordance with the film sensitivity or the switching circuit operated by the delay circuit is adjusted, and by these input factors the working time of the switching circuit is adjusted to control the shutter speed. However, the cameraman can not see the shutter speed control setting, and accordingly can not determine whether the shutter speed is sufficient to avoid the effects of camera movement, for example, whether it is over one-thirtieth second or not, and thereby a long exposure more than one-thirtieth second is often inadvertently used so that the photograph is not taken correctly.

OBJECT OF THE INVENTION

The first object of the present invention is to eliminate the prior drawbacks mentioned above and to provide a shutter speed indication device to warn the cameraman whether the shutter speed automatically controlled by photographic conditions such as the brightness of an object, the film sensitivity, the diaphragm setting is faster or slower than that shutter speed which adversely affects the picture.

The second object of the present invention is to provide a shutter speed indication device in a camera which warns the cameraman whether the shutter speed automatically controlled in response to photographic conditions is faster or slower than a shutter speed which is not suitable for photography.

The third object of the present invention is to provide a shutter speed indication device in a camera which, when the shutter speed automatically controlled in response to photographic conditions such as the brightness of an object, the film sensitivity, and the set up diaphragm setting, indicates a shutter speed slower than the shutter speed at which camera movement affects the picture, can be adjusted to a correct setting, for example, by changing the diaphragm setting.

The other objects of the present invention will be apparent from the description of the embodiment disclosed hereinafter.

SUMMARY OF THE INVENTION

In order to attain the aforementioned objects, in a camera provided with an exposure adjusting mechanism wherein the pointer of an ammeter the deflection angle position of which is fixed by an addition mechanism summing the brightness of an object, the diaphragm setting, the film sensitivity, and respective shutter speed value to coincide with a fixed point (the zero-method). In an exposure control system in which the shutter speed is automatically controlled in accordance with the brightness of an object, the diaphragm setting, and the film sensitivity, the present invention relates to a shutter speed indication device wherein by turning the shutter dial for setting up the manual exposure time and the automatic exposure time control, the shutter speed setting in the exposure adjusting mechanism is changed over and set up to the critical shutter speed setting at which camera movement does not affect the photograph. At the same time a fixed point in the exposure adjusting device indicates the critical shutter speed value, and thereby the shutter speed automatically controlled by the relative position between the fixed point and the pointer warns whether it is higher or lower than the critical shutter speed.

DESCRIPTION OF THE DRAWINGS

FIG. 1 is an arrangement wherein the shutter speed is manually set up by the exposure adjusting mechanism in an embodiment in accordance with the present invention.

DESCRIPTION OF THE EMBODIMENT

Figure 2:
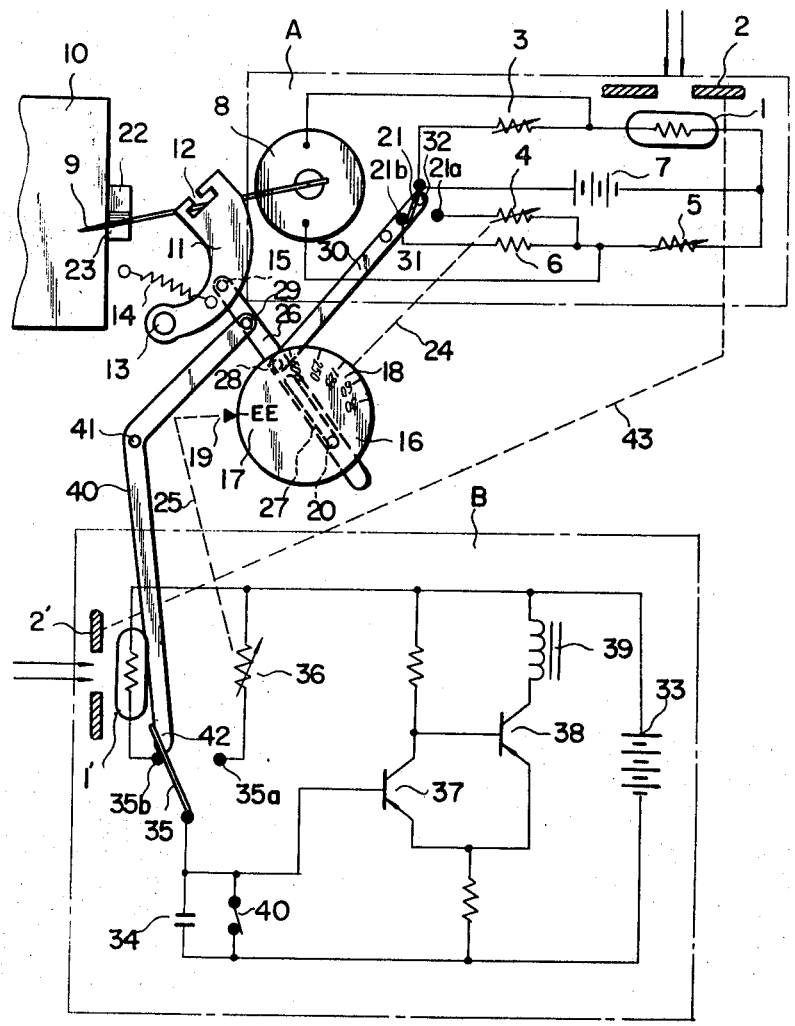
FIG. 2 is an arrangement wherein the shutter speed is controlled by the automatic exposure time control in the embodiment shown in FIG. 1.

FIG. 1 and FIG. 2 show an embodiment comprising exposure adjusting circuit A composed of a bridge circuit and electric shutter control circuit B.

In FIG. 1, exposure adjusting circuit A is provided with photoconductive element 1 for receiving the brightness of an object ($B_v$) incident through the diaphragm value ($A_v$) of diaphragm 2. Variable resistance 4 of which resistance value ($T_v$) is set up in accordance with the shutter speed set by shutter dial 16. Variable resistance 3 is set by the film sensitivity ($S_v$) of the film used. The circuit also includes variable resistance 5, and to the bridge circuit connected to power source 7 ammeter 8 is connected and the deflection angle position of pointer 9 of ammeter 8 is fixed by an addition mechanism the input factors of which are the $B_v$, $A_v$, $T_v$, and $S_v$ values.

The tip of pointer 9 faces one edge in finder 10 and that edge is provided with turning plate 11 having fixed point 12 to coincide with pointer 9. Turning plate 11 is supported on the camera body by pin 13 and biased by spring 14 in order that fixed point 12 faces one edge in finder 10. On the back side of turning plate 11 there is provided pin 15 on which a pin hole provided on one end of interlocking lever 26 is fixed. On the other end of interlocking lever 26 there is provided long slot 27 in which pin 20 provided on the back side of shutter dial 16 is fixed. On shutter dial 16 there are scale EE showing the automatic exposure time control and scale 18 for setting up the manual exposure time and on the camera body mark 19 is formed facing the scales.

As seen in FIG. 1, when mark 19 faces scale 18 for setting up the manual exposure time (for example 1/500 ~ one-thirtieth second) pin 20 is in the middle of long slot 27 and interlocking lever 26 is pulled upward on the oblique left side by turning plate 11 located in a counter-clockwise turning position by spring 14. As seen in FIG. 2 when EE scale 17 of shutter dial 16 coincides with mark 19 pin 20 engages with the tip of long slot 27 and interlocking lever 26 is pulled downward on the oblique right side, and turning plate 11 is located in a clockwise turning position against spring 14. Marks 22, 23 formed on the edge of finder 10 and covered by the counter-clockwise turning position of turning plate 11 are uncovered by the clockwise turning of turning plate 11.

Also, in exposure adjusting circuit A variable resistance 4 forming an arm of the bridge is changed in its resistance value by its interlocking with the turning of shutter dial 16 through interlocking mechanism 24, and variable resistance 4 is connected in series with change over switch 21 having a tendency to be connected to contact 21a. To the other contact 21b of change over switch 21 set up resistance 6 is connected in parallel with variable resistance 4.

Adjusting change over lever 30 mounted loosely on pin 28 provided on the back side of interlocking lever 26 is supported by pin 31, and pin 32 provided on the other end thereof engages with change-over switch 21 and when shutter dial 16 is set at EE pin 32 changes over change-over switch 21 from contact 21a to contact 21b. Further, electric shutter control circuit B is connected to power source 33, and photoconductive element 1' similar to photoconductive element 1 and variable resistance 36 is connected in parallel with photoconductive element 1' and each element is connected in series with condenser 34 by change over switch 35. Transistor 37 forms a Schmidt trigger circuit together with transistor 38 and to the collector of transistor 38 electromagnet 39 for starting the shutter closing operation is connected. And, switch 40 is a timing switch opened with the shutter opening operation.

Change-over switch 35 is biased to contact with contact 35a being always in connection with variable resistance 36, and variable resistance 36 is changed in its resistance value in accordance with the turning of shutter dial 16 through interlocking mechanism 25. On pin 29 provided on the upper side of interlocking lever 26, one end of control change-over lever 40 supported on the camera body by pin 41 is loosely mounted, and pin 42 provided on the other end of control change-over lever 40 engages with change-over switch 35. When shutter dial 16 is set for EE change over switch 35 is changed over to contact 35b to which photoconductive element 1' is connected.

On the front of photoconductive element 1 there is provided diaphragm 2', and diaphragm 2' interlocks with diaphragm 2 of exposure adjusting circuit A through interlocking mechanism 43 and is provided so that both diaphragm values are always equal.

Now, in the state shown in FIG. 1, provided the displacement quantity of pointer 9 of ammeter 8 from fixed point 12 of turning plate 11 is $\delta X$, $\delta X$ is a function using $T_v + A_v - B_v - S_v$ as a displacement index, and under the proper exposure conditions $\delta X = 0$ Therefore, under the proper exposure conditions, provided the brightness of an object, the diaphragm setting, the film sensitivity and the shutter speed are respectively $B_{v1}$, $A_{v1}$, $S_{v1}$, and $T_{v1}$, $$B_{v1} + A_{v1} - S_{v1} - T_{v1} = 0 --- 1$$

Under improper exposure conditions the displacement quantity is $\delta X \gtrless 0$, so that provided the brightness of an object, the diaphragm setting, the film sensitivity, and shutter speed which are set up at this juncture are respectively $B_{v2}$, $A_{v2}$, $S_{v2}$, and $T_{v2}$, $$B_{v2} + A_{v2} - S_{v2} - T_{v2} \gtrless 0 --- 2$$

However, for the cameraman, the brightness of an object and the film sensitivity at that juncture are the photographic conditions previously given, so that $$B_{v1} = B_{v2}$$

$$S_{v1} = S_{v2}$$

And, when the diaphragm is preferentially set up $$A_{v1} = A_{v2}$$

Therefore, from formula 1 and formula 2

$$T_{v1} \gtreqless T_{v2}$$

That is, in order to see whether the shutter speed at that juncture satisfies the proper exposure conditions or not it is only required to determine whether $$\delta X \gtreqless 0$$

Preferably, for automatic exposure time control, the film sensitivity $S_v$ and the diaphragm value $A_v$ are previously set up and the shutter speed $T_{vEE}$ controlled in accordance with the brightness of an object $B_v$ is equivalent to the proper shutter speed $T_v$ as a matter of course, so that in shutter speed EE photographing, when shutter speed $T_{v2}$ is set up for the critical shutter speed to avoid the affects of camera movement, for example, a certain resistance value $T_{v6}$ corresponding to one-thirtieth second, by observing the relative position between pointer 7 and fixed point 9, namely, the displacement quantity $\delta X$, $$\delta X \gtreqless 0$$

Therefore it is possible to determine whether the EE shutter speed $T_{vEE}$ at that juncture is higher or lower than the critical shutter speed, for example, a certain resistance value $T_{v6}$ corresponding to one-thirtieth second.

In the present invention the potential difference in the bridge circuit is measured by ammeter 8 and the pointer 9 of ammeter 8 is arranged to fix the deflection position using $T_v + A_v - B_v - S_v$ as a displacement index relative to fixed point 12 in finder 10. As shown in FIG.

2 when automatic exposure time control scale EE 17 on shutter dial 16 coincides with mark 19 for automatic exposure time control change over switch 21 is changed over to contact 21b on the fixed resistance 6 side and the resistance value of fixed resistance 6 is set for the critical shutter speed, for example, resistance value $T_{v6}$ for one-thirtieth second. And, at this state, using respective values of the brightness of an object $B_v$, the diaphragm setting $A_v$, the film sensitivity $S_v$, and a certain resistance value $T_{v6}$ as an input factor, pointer 9 of ammeter 8 is arranged to swing and at the same time interlocking lever 26 turns turning plate 11 with the EE set up of shutter dial 16 to reveal marks 22, 23 in finder 10. For example, to change the color of mark 22 to blue and that of mark 23 to yellow, and when pointer 9 is on the blue mark 22 the shutter speed is higher than the critical speed and there is no problem with camera movement. When pointer 9 is on the yellow mark 23 the shutter speed is lower than the critical speed and a warning is provided that camera movement will affect the picture.

Figure 3:
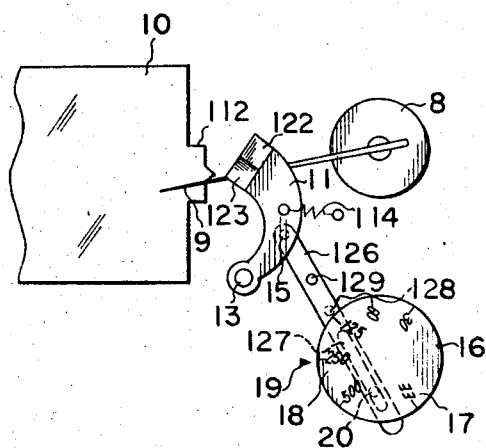
FIG. 3 is a partial view wherein the shutter speed is manually set up by the exposure adjusting mechanism, showing the shutter speed indication device in another embodiment in accordance with the present invention.
Figure 4:
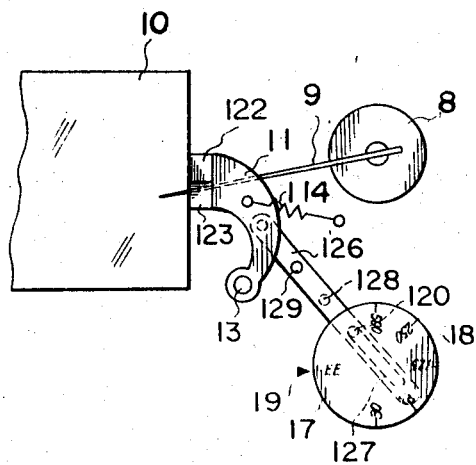
FIG. 4 is a view wherein the shutter speed is controlled by the automatic exposure time control in the embodiment shown in FIG. 3.

In another embodiment shown in FIG. 3 and FIG. 4 in accordance with the present invention, on turning plate 11 there are provided colored marks 122, 123 and on the side edge of finder 10 there is formed fixed marker 122. When manual exposure time scale 18 coincides with mark 19, as shown in FIG. 3 pin 20 is in the middle of long slot 127 and turning plate 11 is located in a clockwise turning position and turning spring 114. When shutter dial 16 is turned in order that its EE scale 17 coincides with mark 19 pin 20 engages with the left upper end of long slot 127 to locate turning plate 11 in a counter-clockwise turning position against spring 114 so as to cover fixed point 112 with marks 122, 123.

I claim:

1. Camera exposure indication apparatus, comprising:
   a shutter speed setting member settable to an automatic exposure controlling position and any one of a number of manual exposure setting positions;
   means for timing the exposure including first variable resistance means varied in accordance with the position of said shutter speed setting member, a light receiving element generating an output as a function of scene brightness, and a first change-over switch for operatively connecting either said first variable resistance or said light receiving element into said means for timing the exposure;
   an ammeter having a pointer positioned at least in accordance with the scene brightness;
   means for controlling the angular position of said pointer in response to exposure conditions and to scene brightness, said means including second variable resistance means varied in accordance with the position of said setting member, a fixed resistance means set in accordance with the longest exposure time that provides an exposure unaffected by camera movement, and a second change-over switch for operatively connecting either said second variable resistance means or said fixed resistance means into said means for controlling;
   first means for indicating a position of said pointer representing a proper exposure condition for the scene brightness;
   second means for indicating a position of the pointer representing said longest exposure time;
   means for selecting either one of said first and second means for indicating;
   means for actuating said first and second change-over switches and said means for selecting in response to the setting of said shutter speed setting member whereby with a manual setting said first variable resistance means, said second variable resistance means and said first means for indicating are selected and with an automatic exposure setting said light responsive means, said fixed resistance means and said second means for indicating are selected.

2. Camera exposure indication apparatus as in claim 1, wherein said means for controlling comprising:
   a bridge circuit including a first arm including a light receiving element for receiving the light ray of an object through the diaphragm of the camera, a second arm including a third resistance variable in accordance with the film sensitivity, a third arm including said second variable resistance, and a fourth arm including said fixed resistance, and the output of said bridge circuit connected to said ammeter.

3. Camera exposure indication apparatus as in claim 1, wherein
   said means for selecting being movable between an operating position for selecting said first indicating means and a rest position for selecting said second indicating means, said apparatus further comprising:
   spring means for biasing means for selecting to said operating position; and
   a connecting rod for connecting said means for selecting to said means for timing the exposure and moving said means for selecting to said rest position with said shutter speed selecting means positioned at said automatic exposure controlling position.

* * * * *